United States Patent [19]

Forquer

[11] Patent Number: 4,618,500

[45] Date of Patent: Oct. 21, 1986

[54] METHOD FOR PREPARING AN ESPRESSO-TYPE COFFEE BEVERAGE

[75] Inventor: Richard Forquer, Glendale, Calif.

[73] Assignee: Fulcrum Enterprises, Cayman Islands

[21] Appl. No.: 767,486

[22] Filed: Aug. 20, 1985

[51] Int. Cl.$^4$ .............................................. A23F 5/24
[52] U.S. Cl. .................................. 426/433; 426/432; 426/474
[58] Field of Search ....................... 426/432, 433, 474

[56] References Cited

U.S. PATENT DOCUMENTS 2,338,608  1/1944  Weisberg ........................... 426/434

OTHER PUBLICATIONS

Sivetz, Coffee Origin and Use, 1973, Coffee Publications: Corvallis, Oregon, Chapter Six-pp. 9a, 9b, 12, 19-21, FIGS. 6-10 to 6-15.

"The Coffee House of Today,", Jun. 1960, The Coffee Brewing Inst., Inc., New York Publication No. 122, pp. 5 to 7.

Winston et al, The Structure and Composition of Foods, 1939, vol. IV, John Wiley & Sons; New York, p. 139.

*Primary Examiner*—Joseph Golian
*Attorney, Agent, or Firm*—Poms, Smith, Lande & Rose

[57] ABSTRACT

A method is disclosed for preparing an espresso-type coffee beverage having an appearance, flavor, texture and aroma like that of freshly-brewed espresso coffee, without the use of conventional espresso coffee machines. The method comprises the steps of brewing, at a reduced temperature and pressure, an aqueous solution of the extract of a roasted and ground espresso-type coffee having a percentage solubles concentration of between 3-4%, cooling the extract thus produced to a temperature between the freezing point of the solution and 45° F., whereby the solution is rendered storable under refrigeration for extended periods, and injecting steam into the solution to heat the solution to serving temperature and to froth the solution to produce a head of the characteristic froth on freshly-brewed espresso coffee. Derivative beverages based upon the espresso extract and the steaming method are also described.

11 Claims, No Drawings

METHOD FOR PREPARING AN ESPRESSO-TYPE COFFEE BEVERAGE

BACKGROUND OF THE INVENTION

1. Field of the Invention

This invention relates, in general, to the preparation of a hot coffee beverage, and in particular, to the preparation of an espresso-type coffee beverage without the use of conventional espresso machines.

2. Description of Related Art

Coffee beverage comprises an aqueous solution of the water-soluble (and sometimes insoluble) constituents of the roasted and ground beans of the tree of the family, Rubiaciae. There are many varieties of this plant, but the only two which have any commercial significance are *Caffea arabica*, and increasingly, *Caffea canephora* ("robusta").

Almost universally, the extract is brewed by contacting the roasted and ground coffee with hot water at a temperature from moderately below boiling to moderately above, for a predetermined brewing time, separating the extract, including the solutes, from the insolubles, and consuming the resulting beverage. (Sivetz, M. and Desrosier, N. W., *Coffee Technology*, AVI Publishing Co., 1979; Clifford, M. N., and Wilson, K. C. (eds.), *Coffee Botany, Biochemistry and Production of Beans and Beverage*, AVI Publishing Co., Inc., pp, 251–284, 1985.)

Additionally, there are a number of ways that liquid coffee extracts and concentrates intended to be held for a period of time under refrigeration may be brewed. For example, U.S. Pat. No. 3,536,496 to Paolini describes a method for making a liquid concentrate of U.S.-type coffee by a drip method using boiling water in a ratio of 4 cups coffee to 8 cups water, to be stored under refrigeration and later diluted with boiling water in a ratio of 7:1.

In U.S. Pat. No. 1,891,383 to Giffen, et al., a method is described for making a liquid coffee concentrate of U.S.-type coffee using water at 30°–50° F. (45° F. preferred) in a series of successive infusions of coffee at a ratio of about 1:1 by weight to form a concentrate having a specific gravity of 1.140.

In U.S. Pat. No. 2,338,608 to Weisberg, et al., a method is described for preparing a concentrate of coffee using water at 60°–100° C., which is successively percolated through a series of leaching units containing roast and ground coffee to produce extracts having a specific gravity 1.0025 and upward for subsequent refrigerated storage at from just below the freezing point of the extract to 60° F.

Brewing methods can generally be categorized in three broad groups: (1) single-pass infusions in which the water is percolated or pumped through the roasted and ground coffee (which may partially serve as its own filter), then filtered through a metal, paper or cloth sieve; (2) percolation methods which recycle the extract through one or more volumes of grind consecutively, in either a co-current or counter-current flow, before the extract is siphoned off at the requisite strength; and (3) batch-slurry methods in which a fixed volume of coffee is mixed with a fixed volume of water is a brewing vessel, permitted to steep with or without agitation, then filtered or mechanically separated to produce the extract.

Espresso (or expresso) coffee beverage is a type which has found wide acceptance abroad, both in Europe and in Latin America. (See, Sivetz, M., *Coffee Origin & Use*, Sivetz Coffee Inc., 1977, Rev. 1978 & 1984.)

Espresso-type coffee typically comprises the dark-roasted beans, ranging from the dark, Viennese roast (15–16% moisture weight loss), to the French-type roast (17–18% moisture weight loss) and very black beans, to the Italian-type roast (19–20% or more moisture weight loss), which have a distinct, almost-burnt appearance and smell, with droplets of coffee oil formed on the surface of the beans. These darkly-roasted beans have considerably less acidity, aldehydes and aromas, are more brittle (and hence, subject to finer grinding and higher extraction rates), and have a higher fatty acid content than the lighter roasts.

Espresso coffee extract is produced by a positive displacement of a fixed quantity of water under pressure, usually by piston displacement, at super-heated temperatures (approx. 225° F.) through a closely-measured (20 ml., 8 g.), packed bed of very-finely ground (300–400 microns) blend of espresso-type roasted beans contained in a chamber called a "porter filter" about 1 cm. high and 5 cm. in diameter (1 cup serving), having a very fine filter on the output side of the chamber. The cofee-to-water ratio is 3:1 by volume and 6–8:1 by weight. The 60 ml. (2 fl. oz.) charge of water passes through the grinds in a total extraction time of 1–4 seconds, yet produces a 1 fl. oz. serving of extract (typically served in a 1–3 fl. oz. demitasse cup), having a 3–4% solubles concentration with a 25% solubles yield and without exhaustive extraction. Espresso beverage prepared in the conventional manner will have an end temperature of about 150° F. by reason of cooling contact between the hot water and the cold grounds and brewing chamber. Since this is very nearly at serving temperature, it is customary for some operators to "preheat" the porter filter and the serving cups to prevent the beverage from cooling too much. The beverage thus produced contains large amounts of colloidal matter and a small amount of insolubles, and has a dark, rich flavor and appearance which is accompanied by a head of lighter-colored froth, the so-called "creme-de-cafe" demanded by espresso beverage devotees. The beverage is intended to be consumed immediately with no holding time or reheating.

This is by contrast to American-style coffee extracts which, when brewed under recommended "ideal" conditions, is made by percolating a quantity of hot water (185°–205° F.) through a bed of relatively coarsely-ground (720–1200 microns), lightly-roasted coffee contained in an open field in a filter basket or a filter-paper cone in a water-to-coffee ratio of about 1.9–2.5 gal./lb., for a time period between 2–7 minutes (depending upon grind size) to produce 6–40 servings of between 5–7 fl. oz. each (typically served in 6–8 oz. cups or mugs), at a 1.15 to 1.35% solubles concentration, with an 18–22% solubles yield, but which may include exhaustive extraction. The beverage contains less colloidal matter, no insolubles (desirably), is lighter in color, aroma and texture, and contains no froth. It is intended either to be consumed immediately or held at serving temperature for periods of one hour or more.

Thus, the time/temperature exposure of the espresso coffee beverage is in the ratio of 1:100 to that for American-style extracts. Hence, the name "Espresso" carries with it several connotations, viz., a beverage that is brewed "quickly", a beverage that is brewed by "removing the essential part", and a beverage that is made "expressly", i.e., contemporaneously, in small individual servings for the consumer.

The key to producing a consistently high-quality espresso beverage (in addition to maintaining quality of beans, blend and roast), lies in maintaining a close control over the brewing process. Given the small quantities involved in the preparation of the individual-sized servings and the very short, time/temperature exposure of the coffee to water, a very small latitude for error in brewing is presented, relative to U.S.-style extracts. Thus, only a slight variation in any of the above brewing factors can result in a beverage that is either disagreeably weak or harshly bitter and astringent, with a resultant consumer rejection reaction that is proportionately stronger than to badly-brewed U.S.-style extracts.

Consequently, espresso brewing machines tend to be relatively large, complicated and expensive. Although there is a simple, range-type, two-chamber pressure-brewer called a "machinetta" for preparing small quantities of extracts made in the home, it does not permit the requisite degree of control to be exercised over the brewing operation as does the larger, automated, commercial machines, nor is the extract produced as consistently frothy as with the latter. The larger machines typically are sized in terms of the volume of the pressurized hot-water tank, as well as the number of brewing stations, or dispensing heads, each containing its own so-called "porter filter" to make either one or two cups of extract, although very large machines capable of brewing 1-2 liters at a time are known.

These machines are typically provided with a steam dispenser for heating and scalding milk which is added to the espresso extract to form a beverage called "Cappuccino".

These machines tend to be very large and expensive. While a small, portable, one-or two-cup machine for the home may be had for a few hundred dollars, even the smallest of restaurant or commercial espresso machines will occupy several cubic feet in volume and cost in the range of $1,000-$3,000, and very large machines can cost as much as $5,000 and take up a whole wall of a room, all representing a significant space and capital investment for a small establishment wishing to serve a quality espresso beverage.

Another problem with the machines is their complexity. A considerable degree of control is required over the very short brewing time and the higher pressures, temperatures, and volumes of water delivered to the grinds, requiring relatively precise adjustments, and the mechanization of which leads to high maintenance requirements and increased probability to breakdowns and/or downtime for the machine. Related to this is the fact that these machines, for the most part, are manufactured in foreign countries; hence, parts and service can be problematical.

Another problem is that they tend to be both labor- and time-intensive. As indicated, extracts are typically prepared on a one-or-two cup basis, at the most, and involves the grinding of the beans, the loading and tamping of the grinds in the porter filter, the locking of the porter filter to the machine and the activation of the lever or switch to begin the charge of metered water flowing through the grind. This tends to be time-consuming and can present a bottleneck for the household or small establishment having, say, 4-12 guests in a party who all wish to be served simultaneously with their beverage. This problem is multiplied for large establishments. This, in turn, tends to require a relatively skilled operator whose services can almost of necessity be exclusively dedicated to the day-to-day preparation, loading, maintenance and operation of the machines. (For a discussion of some of the specialized knowledge required of the potential purchaser/operator of smaller machines available, see, "Profits under Pressure: Espresso/Cappucino Machines", *Gourmet Retailer;* Miami, Fla., pp. 16÷37, Nov. 1983).

Much of the recent technical art in the espresso field has thus been devoted to apparatus designed to overcome some of the above problems. See, e.g., U.S. Pat. No. 4,405,191 to Longo for an improved dispensing unit for espresso extract which is said to overcome water metering problems; U.S. Pat. No. 4,484,515 to Illy for an automatic espresso coffee machine utilizing pre-loaded coffee pods and microprocessor technology; and U.S. Pat. No. 4,151,626 to Berthelia for an apparatus for cleaning the cup-shaped filters associated with espresso machines.

It is by reason of the foregoing problems that many households and small restaurants forego having an espresso machine on the premises altogether.

SUMMARY OF THE INVENTION

It is therefore an object of this invention to provide a method for preparing an espresso-type coffee beverage having an appearance, flavor, texture and aroma like that of freshly-brewed espresso coffee, which eliminates the need for a conventional espresso machine.

It is a further object of the invention to provide such a method as can produce a large number of individual servings of the beverage simultaneously.

It is yet a further object of the invention to provide such a method as will permit one or more servings of beverage to be prepared quickly and by relatively unskilled labor.

It is still yet a further object of the present invention to provide such a method as will permit a relatively-large quantity of the beverage to be brewed beforehand and stored for relatively long periods before preparation for serving.

These, and other objects and advantages of the present invention, are preferably accomplished in a method which provides for:

brewing, at a reduced temperature and pressure, and for an extended period, an aqueous solution of the water-soluble constituents of a roasted and ground espresso-type coffee having a 3-4% solubles concentration, containing substantially no undissolved matter;

immediately cooling the solution to a temperature of between the freezing point of the solution and about 45 degrees Farehnheit;

holding the solution in a non-reactive, airtight container at a temperature between the freezing point of the solution and about 45° F. until ready to prepare for serving;

pouring a portion of the solution into a non-reactive, heat-resistant, open-top preparation vessel in an amount corresponding to the number of servings desired to be prepared;

injecting relatively-dry steam into the solution in a region near the bottom of the preparation vessel at a temperature and velocity sufficient to just heat the solution to about serving temperature without boiling and without substantially diluting the solution with condensed water from the steam;

injecting relatively-dry steam into the solution in a region near the surface of the solution at a temperature and velocity sufficient to form a froth on the top of the solution that is substantially identical to the froth on freshly-brewed espresso, in the amount desired; and dispensing the heated, frothed solution from the preparation vessel into individual serving cups for immediate serving, while insuring that each cup receives a portion of froth.

A more complete understanding of the invention will become evident from a consideration of the following detailed description of the steps in the method.

DETAILED DESCRIPTION

The art of making espresso coffee beverage is at least eighty-five years old. The paradigm of the method, and the equipment necessary, are as explained above. What is *not* known in the art is that, if a large quantity liquid extract of roast and ground espresso-type coffee is brewed by an unconventional means, i.e., one not requiring the conventional espresso times, temperatures, pressures and equipment, and then stored properly under refrigeration, the cooled extract can then later be "reconstituted", i.e., heated and frothed with steam into a beverage that is indistinguishable from a cup of freshly-brewed espresso coffee prepared in the conventional manner.

The first step, then, is the preparation of a suitable liquid solution of espresso coffee extract. In preparing the extract for use with the present invention, the following should be kept in mind regarding temperature:

The higher the brewing temperature, the more volatiles will be driven off of the type which contribute to the characteristic flavor of the brew. Since it is desirable to retain these in solution for a later liberation in the steaming step, a lower brewing temperature is required than the 225° F. of conventional espresso machines.

Secondly, the solution prepared will be begin to deteriorate immediately as a function of time, temperature and exposure to air and sunlight. Since it is desirable to brew a relatively large quantity of the solution for later preparation with steam, it becomes desirable to retard this deterioration, beginning in the brewing stage. One of the more inmportant chemical changes that affects the flavor and texture of the extract is hydrolysis, the reaction rate of which is strongly temperature-dependent. Extended holding times at the higher temperatures produce complex molecules formed from the more-desirable flavor constituents, which then contribute to the later precipitation of bad-tasting tars, fatty acids and oils that adversely affect the extract. Similarly, the desirable colloidal nature of the extract is adversely affected by higher temperatures, particularly for the darker roasts of coffee, which again militates against higher processing temperatures.

However, brewing temperatures significantly below room temperature entail disproportionately-long brewing time with concommitant lower yields of the solubles and the leaching out of pulp constituents of the coffee bean which contributes to a grainy or woody taste.

Thus, in the method of the present invention, an extract of roast and ground espresso-type coffee is brewed by any method which contacts the coffee with water at an intial temperature of from between 65°-212° F. at ambient pressure for a period of time sufficient to produce a non-exhaustive (20-25% yield), aqueous solution of the coffee having a solubles content of between 3-4%. In the preferred method, the extract is brewed by a simple, batch-slurry method in an open container. Until the brewing protocol has been finally established in terms of time, temperature and the ratio of coffee-to-water, it is preferably that the percent solubles present in the extract be monitored, e.g., with a hydrometer or an inexpensive conductometer which has been appropriately calibrated.

The extract is then filtered to remove substantially all undissolved particulate matter and colloidal matter above about 1 micron in size. The filtered aqueous solution is then poured into non-reactive, airtight containers and immediately refrigerated to a temperature of between the freezing point of the solution and about 45° F. It is not desirable to freeze the solution, because this will often cause some colloidal particles and any tars present in the solution from the roasting process to precipitate out, which will not then redissolve upon thawing. The extract thus produced is at drinking strength and no further dilution or concentration is either necessary or desirable.

The second step of the method comprises the operation of steaming the solution to heat it to serving temperature, to liberate the flavor volatiles dissolved in the chilled extract, and to produce the characteristic frothy head of "creme de cafe" on the top of the solution through which the beverage is sipped.

The apparatus necessary to practice this steaming step is relatively simple to provide. All that is needed is a source of relatively dry steam at a pressure sufficient to "jet" the steam at a relative high velocity through the solution, to heat the solution quickly and to produce the froth, in a controlled manner, without substantially diluting the solution with water condensed from the steam and without "cooking" the extract. The injection of steam into the solution is by means of an elongated tube which is connectible at one end to the source of steam by means of a valve, which permits the operator to adjust the flow rate of the steam into the tube. The other end of the tube is closed off by a cap or closure having a plurality of small apertures to create a group of nozzles at the end of the tube through which the steam is expanded to impart a relatively high velocity to the steam. Prototypes of a small, fully-automatic machine which is capable of providing steam of a pressure of between 1-1.75 kg/cm$^2$ (30/40 psig) at a temperature of about 210°-220° F. (the preferred range), capable of supplying all of both the steam and hot water requirements for beverages of a small-to-medium sized restaurant, have been fabricated for applicant which occupy a space of about 1.5 cubic feet, and which can be carried about easily by one man, which costs about $100-$150 in production.

In the preferred embodiment, the step of preparing the extract for serving comprises decanting the refrigerated solution into an open-topped preparation vessel capable of withstanding moderate heat in an amount corresponding to the number of servings desired to be prepared. As many as 12, 1 to 2 oz. cups or more may be prepared at once. The open top is preferred to permit the operator to view the solution during preparation, particularly to estimate the quantity of froth produced. The steam tube is then immersed into the solution in the vessel to a region near the bottom of the vessel, and the control valve is opened to permit the steam to expand through the nozzles and into the solution, where it bubbles up through the solution to heat it quickly (2-20 secs., depending upon volume). However, care must be taken not to boil the solution extensively, as this will adversely affect the flavor and aroma of the beverage.

In this regard, it is to be noted that the beverage may be heated to a slightly higher end-temperature than that produced by conventional machines (150° F.), e.g., to 160°–165° F., to prevent the overcooling effect of the conventional espresso discussed above, as well as to suit the U.S. preference for a slightly hotter serving, without danger of over-extraction or "cooking" the extract.

After the solution has been heated, the vessel is lowered (or the steam tube raised) to position the group of nozzles in the region just below the surface of the solution, where steam is injected through the nozzles to froth the solution and to expand it to the content of creme de cafe desired, depending upon the consumer's preference. However, it is to be noted that with the present method, it is possible to expand the solution into froth in a much higher quantity than is produced by conventional espresso machines. Thus, for example, a 1 oz. portion of liquid solution can easily be frothed to contain nearly double or triple the original volume of solution in froth; thus, it may be desirable to serve the typical 1 oz. portion in a 2–3 oz. cup for those patrons or guests desiring a copious quantity of froth.

After the beverage has been prepared, it is dispensed into individual serving cups, insuring that each cup contains a portion of the froth, and served immediately.

As will now be evident to those skilled in the art, almost limitless varieties of beverages are possible which are based upon the espresso extract and steaming method. For example, there are presently available on the market a number of domestic and imported liquid extracts of various foods and spices which comprise the essential oils or flavors of those foods in a very concentrated form. If these extracts are blended with the espresso extract of the present method in suitable proportions, either before bottling or just before steaming, a frothy espresso-type beverage having the flavor suggestive of the concentrate can easily be produced, which can be made either alcoholic or non-alcoholic, as the customer prefers. Thus, applicant has produced espresso-type beverages having the flavor of Irish coffee, creme de menthe, German chocolate, chocolate mint, peppermint and others.

Accordingly, the scope of the present invention, a method for making an expresso-type beverage having a flavor, aroma, texture and appearance of freshly-brewed espresso coffee without the use of conventional espresso machines, should be limited only by the appended claims.

What is claimed is:

1. A method for preparing an espresso-type coffee beverage having an appearance, flavor, texture and aroma like that of freshly-brewed espresso coffee, comprising the steps of:

pouring a substantially froth-free aqueous solution of water-soluable extract of espresso coffee containing between about 3–4% solutes and having a temperature between about the freezing point of said solution and ambient temperature into an open-topped, heat resistant preparation vessel in an amount sufficient to make the number of servings desired;

injecting steam into said solution in a region near the bottom of said solution in said vessel at a temperature and velocity sufficient to heat said solution to the serving temperature desired without boiling or substantially diluting said solution with water condensed from said steam, and at region near the top of said solution to form a froth on top of said aqueous solution which is substantially identical to the froth on freshly-brewed espresso coffee; and dispensing said heated, frothed solution into individual serving cups for immediate serving, each said cup containing a portion of said froth.

2. The method of claim 1, wherein said step of pouring said solution further comprises:

said solution having a temperature between about the freezing point of said solution and 45° F.

3. The method of claim 2, wherein said step of pouring said solution further comprises:

said solution containing substantially no undissolved particulate matter above 1 micron in size.

4. The method of claim 2, wherein said step of injecting said steam further comprises the steps of:

inserting one end of a steam conduit into said regions of said solution, said one end being terminated in a closure having at least one aperture therethrough to form a nozzle therein to impart said velocity to said steam when said steam is expanded therethrough, said steam conduit being connectable at its other end to a source of said steam; and connecting said source of steam to said other end of said conduit for a period of time sufficient to accomplish said heating and said frothing of said solution.

5. The method of claim 3, wherein said step of injecting said steam further comprises the steps of:

inserting one end of a steam conduit into said regions of said solution, said one end being terminated in a closure having at least one aperture therethrough to form a nozzle therein to impart said velocity to said steam when said steam is expanded therethrough, said steam conduit being connectable at its other end to a source of said steam; and connecting said source of steam to said other end of said conduit for a period of time sufficient to accomplish said heating and said frothing of said solution.

6. The method of claim 4, wherein said step of injecting said steam further comprises:

said source of steam having a pressure of between about 30–40 psig and a temperature of between abaut 210° F. and 220° F.

7. The method of claim 5, wherein said step of injecting said steam further comprises:

said source of steam having a pressure of between about 30–40 psig and a temperature of between about 210° F. and 220° F.

8. A method for preparing an espresso-type coffee beverage having an appearance, flavor, texture and aroma like that of freshly-brewed espresso coffee, comprising the steps of:

brewing an extract of the water-soluble constituents of roasted and ground espresso-type coffee containing between about 3–4% solutes;

filtering said solution to remove substantially all undissolved particulate matter above 1 micron in size;

cooling said solution to a temperature between about the freezing point of said solution and 45° F.;

pouring said solution into an open-topped, heat-resistant brewing vessel in an amount sufficient to make the number of servings desired;

injecting steam into said solution in a region near the bottom of said solution in said vessel at a temperature and velocity sufficient to heat said solution to the serving temperature desired without boiling or substantially diluting said solution with water condensed from said steam, and at region near the top of said solution to form a froth on top of said aqueous solution which is substantially identical to the froth on freshly-brewed espresso coffee; and dispensing said heated, frothed solution into individual serving cups for immediate serving, each said cup containing a portion of said froth.

9. The method of claim 8, wherein said step of injecting said steam further comprises the steps of:

inserting one end of a steam conduit in said regions of said solution, said one end being terminated in a closure having at least one aperture therethrough to form a nozzle therein to impart said velocity to said steam when said steam is expanded therethrough, said steam conduit being connectable at its other end to a source of said steam; and connecting said source of steam to said other end of said conduit for a period of time sufficient to accomplish said heating and said frothing of said solution.

10. The method of claim 8, wherein said step of injecting said steam further comprises:

said source of steam having a pressure of between about 30–40 psig and a temperature of between about 210° F. and 220° F.

11. The method of claim 9, wherein said step of injecting said steam further comprises:

said source of steam having a pressure of between about 30–40 psig and a temperature of between about 210° F. and 220° F.

* * * * *